(12) United States Patent
Kao

(10) Patent No.: US 6,208,035 B1
(45) Date of Patent: Mar. 27, 2001

(54) POWER GENERATION APPARATUS UTILIZING ENERGY PRODUCED FROM OCEAN LEVEL FLUCTUATION

(76) Inventor: I-Nan Kao, No. 5-1, Minchuan St., Shiau-shi Isuen, Hu-rou Hsiang, Hsinchu County (TW)

( * ) Notice: Subject to any disclaimer, the term of this patent is extended or adjusted under 35 U.S.C. 154(b) by 0 days.

(21) Appl. No.: 09/576,326

(22) Filed: May 22, 2000

(51) Int. Cl.[7] .................................................. F03B 13/10
(52) U.S. Cl. ............................ 290/42; 290/53; 60/505; 60/507
(58) Field of Search ..................... 290/53, 42; 60/497, 60/498, 505, 507

(56) References Cited

U.S. PATENT DOCUMENTS

| | | | |
|---|---|---|---|
| 3,697,764 | * 10/1972 | Staniziola et al. | 290/42 |
| 4,060,344 | * 11/1977 | Ootsu | 417/330 |
| 4,206,601 | * 6/1980 | Eberle | 60/398 |
| 4,389,843 | * 6/1983 | Lamberti | 60/507 |
| 4,392,060 | * 7/1983 | Ivy | 290/53 |
| 4,438,343 | * 3/1984 | Marken | 290/53 |
| 4,598,547 | * 7/1986 | Danihel | 60/507 |
| 4,599,858 | * 7/1986 | Stella et al. | 60/497 |
| 5,176,552 | * 1/1993 | Kuboyama et al. | 441/16 |
| 5,710,464 | * 1/1998 | Kao et al. | 290/53 |

FOREIGN PATENT DOCUMENTS

3200352A1 * 7/1983 (DE) .

* cited by examiner

Primary Examiner—Joseph Waks
(74) Attorney, Agent, or Firm—Rosenberg, Klein & Lee

(57) ABSTRACT

A power generation apparatus utilizing energy produced from ocean level fluctuation includes a working platform having a plurality of guy rods provided around its circumference each attached with a buoy under the working platform in the water; and a damper installed on top of each guy rod above the working platform; a connecting rod extended to the inner part of a generator unit installed coaxially on the working platform is connected to the center of a ratchet wheel clamped in each clamper. With such a structure, when the buoys move up and down following ocean level fluctuation, the dampers on top of the guy rods drive the ratchet wheels to rotate and the rotating torque of the ratchet wheels is transmitted to the generator unit thereby being converted to electric power.

7 Claims, 5 Drawing Sheets

POWER GENERATION APPARATUS UTILIZING ENERGY PRODUCED FROM OCEAN LEVEL FLUCTUATION

BACKGROUND OF THE INVENTION

1. Field of the Invention

The present invention relates to a power generation apparatus, and more particularly, to a power generation apparatus utilizing energy produced from ocean level fluctuation.

2. Description of the Prior Art

Clean and rich water energy produced from ocean level fluctuation is one of the most favorable natural energy resources for mankind in the world. As the ocean level fluctuates repeatedly everywhere and every day and night regularly so that unlimited potential energy can be obtained therefrom, it is a negligible energy source waiting for us to utilize.

Incidentally, it is regretable that no generating systems utilizing ocean energy which have been developed up to now is satisfactorily operatable owing to low efficiency and high operation cost. Not very long ago, the instant inventor of the present invention disclosed U.S. Pat. No. 5,710,464. Which was honored by U.S. patency. The invention converts the potential energy produced from head difference caused by ocean level fluctuation into a kinetic power for a generator by means of lever principle. This was a discovery of innovative non-environmental pollution energy source and acquired both Geneve Golden Plate Prize and National Scientific Research Prize of ROC for the inventor. However, there are some shortcomings which are to be overcome. For example, most parts of the power drive system are submerged in the sea water constantly free to growth of parasitic planktons causing shortening of lifetime due to rustiness. Besides, both operation and maintenance costs for the apparatus submerging in the sea are considerably high, on the other hand, utilizing lever principle to enhance a pressure for obtaining larger output will inevitably shorten the dynamic stroke such that only a minimum difference of ocean lever can be utilized. In this situation, it is difficult to generate constant and reliable power output where the fluctuation of ocean level is not significant.

In order to solve the above described problems inherent to the former invention, the present inventor carried out theoretical studies and simulating experiments with more intensified efforts. Based on these studies and researches, the present inventor came to propose the present invention.

SUMMARY OF THE INVENTION

It is an object of the present invention to provide a power generation apparatus which can utilize only a very slight fluctuation of ocean level to generate constant and uninterrupted power.

It is another object of the present invention to provide a power generation apparatus which can be completely exposed on the sea water level with only its buoy submerged in the sea water so as to ensure fault free operation, facilitate maintenance work and minimize cost.

It is one more object of the present invention to provide a power generation apparatus utilizing energy produced from ocean level fluctuation so as to supply power efficiently without causing environmental pollution and damage to existing ecosystem.

In keeping with an aspect of the invention, these and other objects of the present invention are accomplished by providing a power generation apparatus which comprises a working platform having a plurality of guy rods provided around its circumference each attached with a buoy under the working platform, and a damper installed on top of each guy rod above the working platform; a connecting rod extended to inside of a generator unit installed coaxially on the working platform is connected to the center of a ratchet wheel clamped in each clamper. With such a structure, when the buoys move up and down following ocean level fluctuation, the dampers on top of the guy rods drive the ratchet wheels to rotate, and the rotating torque of the ratchet wheels is transmitted to the generator unit thereby being converted to electric power.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE PREFERRED EMBODIMENT

Figure 1:
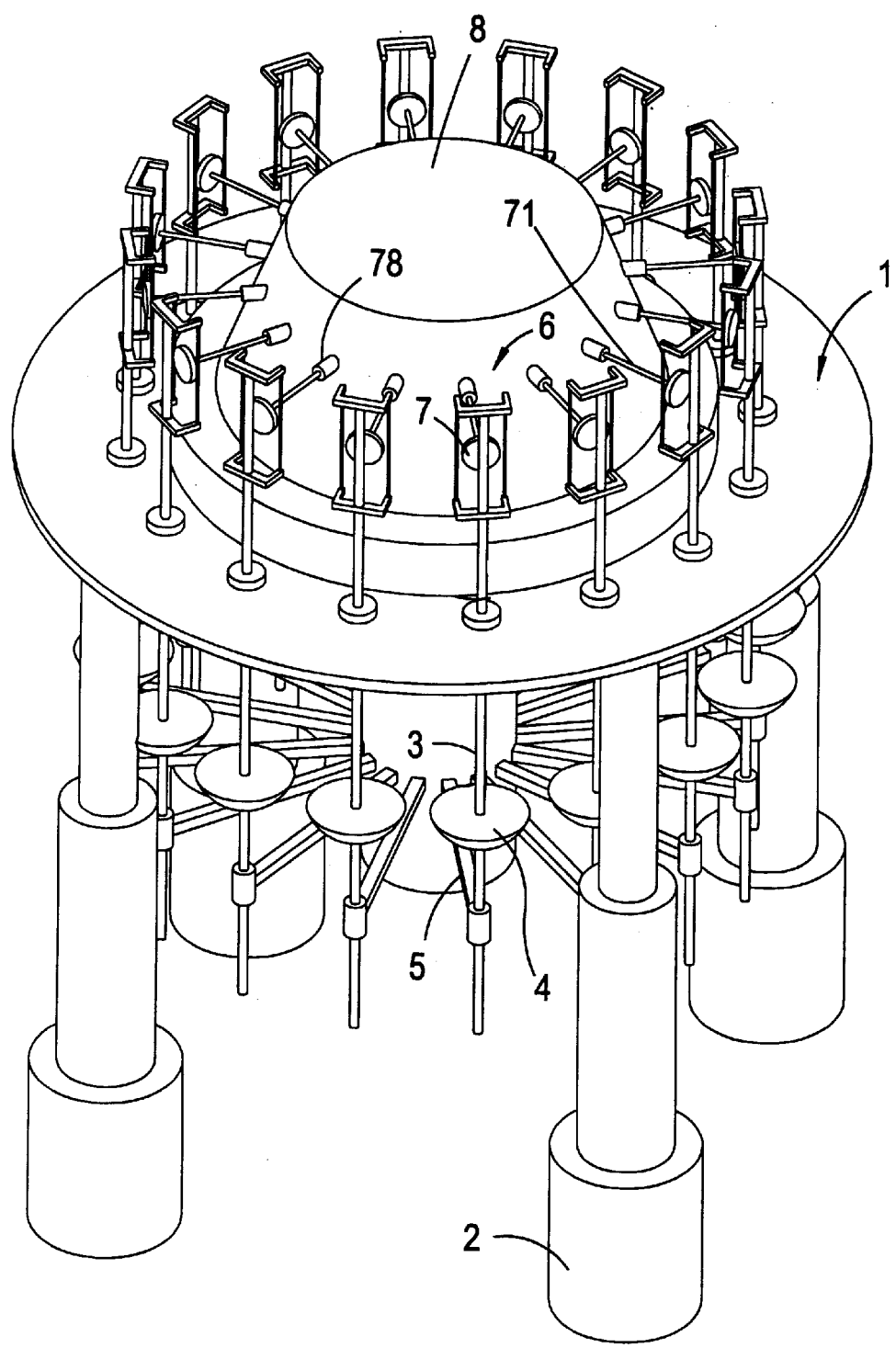
FIG. 1 is a schematic view showing the structure of the present invention.
Figure 2:
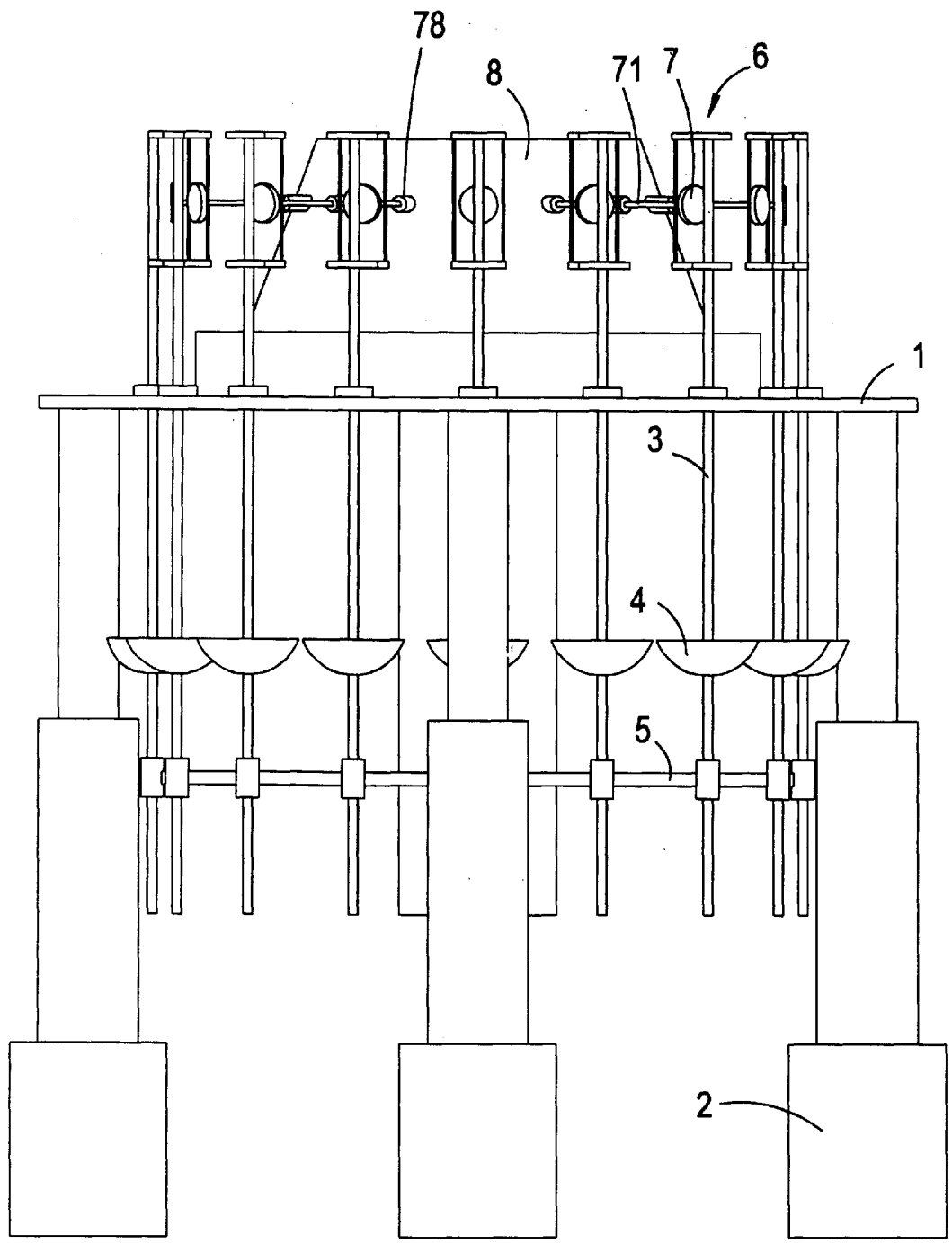
FIG. 2 is a front view of the present invention.

Referring to FIGS. 1 and 2, the power generation apparatus of the present invention comprises a working platform 1 for entraining individual equipment and devices to be described later. There are four foundations 2 installed under the working platform 1 with equal spacing along the circumference thereof which being sunk into sea bottom for supporting the working platform 1. A plurality of guy rods 3 disposed in circulating form are penetrating through the working plate 1 to be able to move up and down. Each guy rod 3 is attached with a buoy 4 under the working platform 1 to wave up and down with the guy rods 3. A brace 5 installed near the bottom end of the guy rod 3 for preventing it from rocking when the apparatus is working. A clamper 6 fixed to upper portion of each guy rod 3 above the working platform 1 is shading a ratchet wheel 7 having a connecting rod 71 connected to its center. The connecting rod 71 is extended to the rotor rim of a generator unit 8 located at the center of the working platform 1. A positioning head 78 fitted at the front end of the connecting rod 71 is for positioning the ratchet wheel 7 and the connecting rod 71 at their position above the working platform thereat and not to be shifted by the guy rod 3. At the moment the clamper 6 is pulled by the guy rod 3 and moved up and down, the ratchet wheel 7 is driven to rotate in single direction and transmit mechanical power to the generator unit 8 via the connecting rod 71 so that the mechanical power is converted to electric power and delivered out of the generator unit 8 in the form of electrical current.

The plurality of guy rods 3, buoys 4, clampers 6, and ratchet wheels 7 installed around the periphery of the working platform 1 can work individually and independently without interfering each other. As a result, parts of them stop working by some reason will never be affecting the generator unit 8 to maintain uninterrupted power supply.

The inner part of the buoy 4 is hollow and is usable for filling water, sand or other weights for regulating the buoyancy of the buoy 4 according to an actual requirement so as to operate generator unit of different ratings. The fundations 2 are used to stabilize the floating working platform 1. The fundations 2 are also formed hollow. After placing the working platform 1 at a proper position, the foundations 2 are filled with water, sand or other weights to stabilize the working platform 1. In addition, the length of foundations 2 can be adjusted to meet the different state of sea bottom so as to maintain the working platform 1 floating horizontally on the ocean level.

Figure 3:
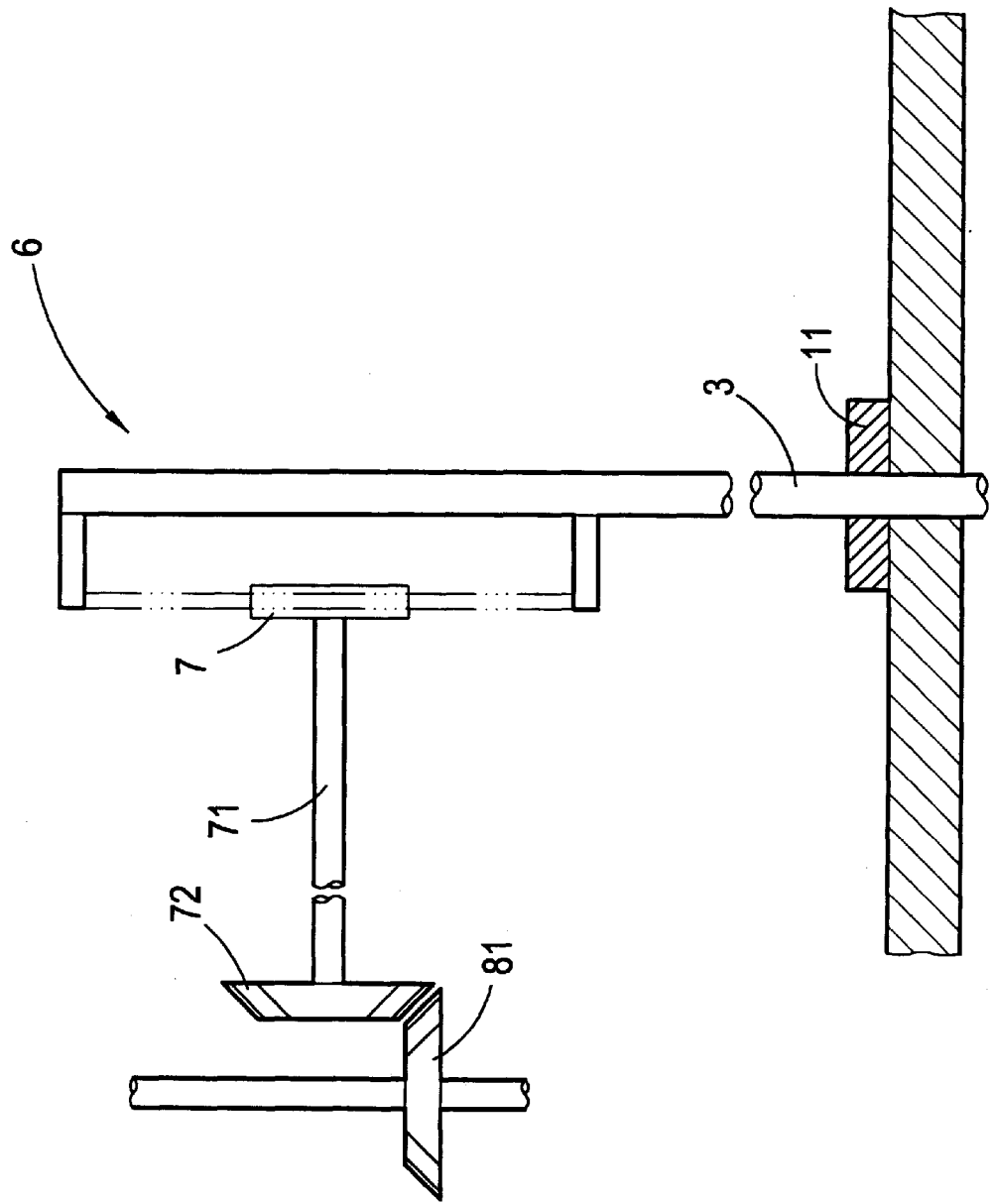
FIG. 3 is a view showing how the power is transmitted by the present invention.

As shown in FIG. 3, the ratchet wheel 7 can only rotate in one direction. When the guy rod moves up and down, the clamper 6 urges the ratchet wheel 7 to rotate in the prescribed direction, and at the same time drives the connecting rod 71 to rotate. Here, a bevel gear wheel 72 attached to one end of the connecting rod 71 and screw engaged to another bevel gear wheel 81 of the generator unit 8 transmits the rotational torque to the generator unit 8 for generating electric current. A bearing 11 is provided at the place where the guy rod 3 passing through the working platform 1 so as to stabilize extension and retraction motion of the guy rod 3.

Figure 4:
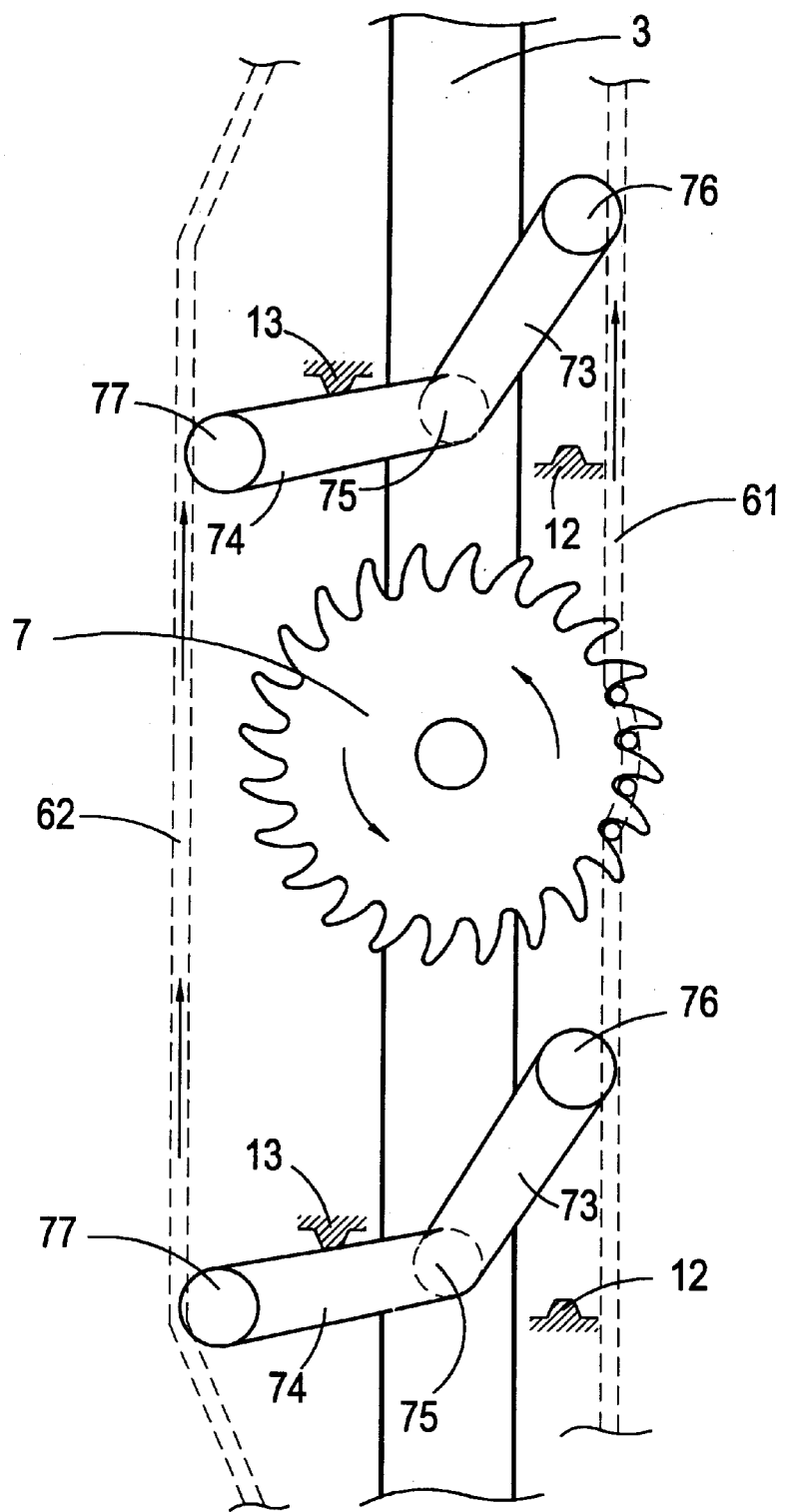
FIG. 4 is a view illustrating operational principle of the present invention (1)
Figure 5:
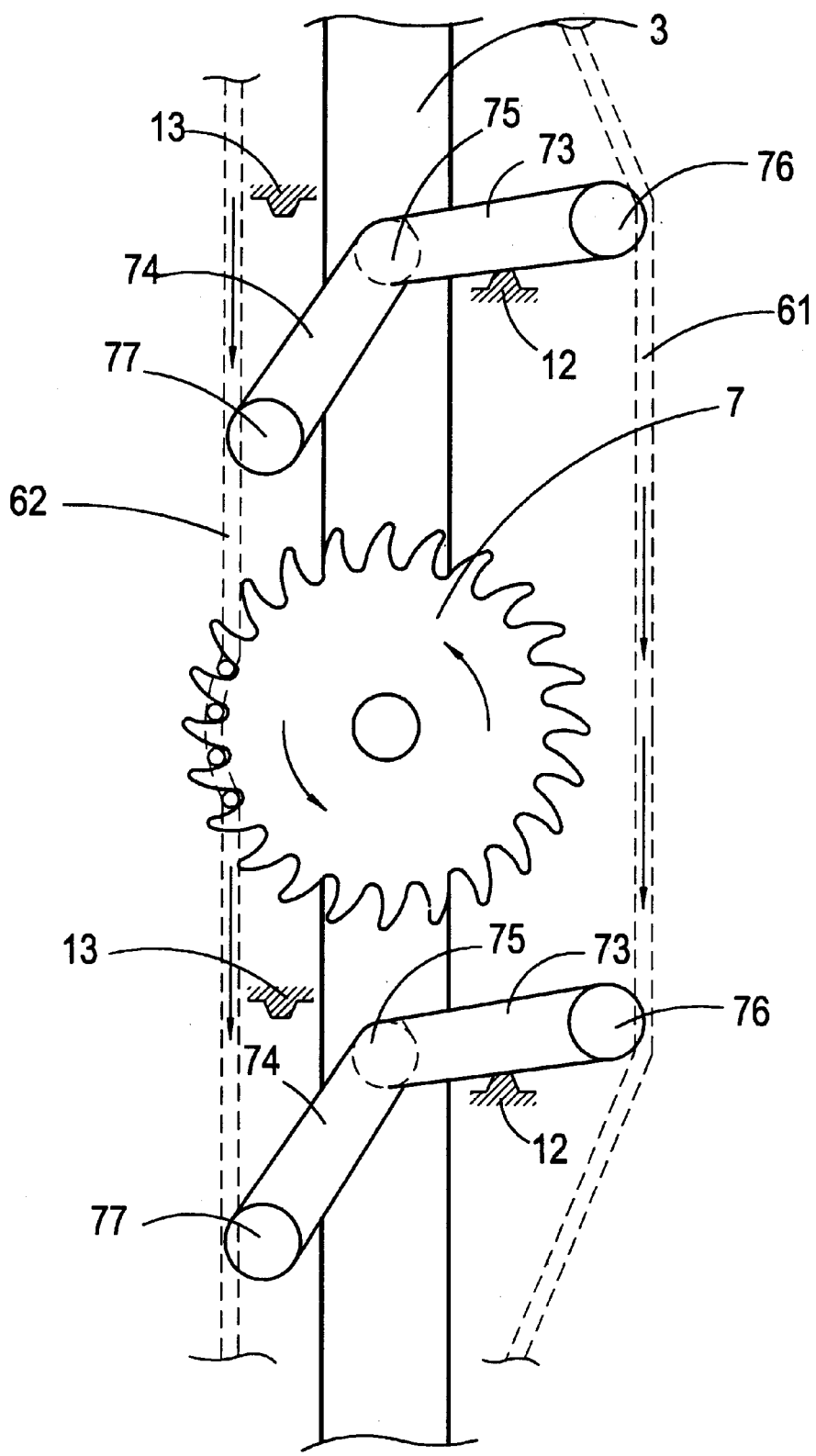
FIG. 5 is a view illustrating operational principle of the present invention (2).

Referring to FIGS. 4 and 5, chains 61 and 62 are combined to two sides of the ratchet wheel 7 in the clamper 6, and there are two pairs of posts 73 and 74 whose lengths slightly larger than radius of the ratchet wheel 7 are installed respectively above and below the ratchet wheel 7 each pair with a pivot 75 attached on the center of the lateral surface of the guy rod 3. Both pairs of posts 73 and 74 are bent upward with respect to the pivots 75, and two stoppers 12 are formed respectively on the working platform 1 below two posts 73, and other two stoppers 13 are respectively formed diagonally to the former stoppers 13 on the working platform 1 above each post 74. As shown in this embodiment, the ratchet wheel 7 is rotating conterclockwise, when the guy rod 3 is raised by rising of the buoy 4, all posts 73 and 74 are raised too, of which the two left posts 74 are stopped by stoppers 13 and remain at a horizontal position and push the left side chain 62 apart from the ratchet wheel 7. At the same time, the two right side posts 73 swing upward with an angle such that the right side chain 61 gear combines the ratchet wheel 7 to make it rotate. When the guy rod 3 descends, all posts 73 and 74 go down too and the right side posts 73 push the right side chain 61 apart from the ratchet wheel 7, while the left side chain 62 gear combines the ratchet wheel 7 to make it rotate. By alternating above described action, the ratchet wheel 7 maintains its continuous rotation. If it is desired to reverse the rotational direction of the ratchet wheel 7, only thing to do is reversing the installation of all stoppers 12 and 13. Besides, rollers 76 and 77 are provided at respective terminal of the posts 73 and 74 for rotating freely to alleviate the friction between the posts 73, 74 and the chain 61, 62 in case the posts 73, 74 are held stationary by the stoppers 12, 13. When the posts 73, 74 are released from detention of the stoppers 12, 13, the rollers 76, 77 stop rolling and let the ratchet wheel 7 to operate.

The advantages of the power generation apparatus utilizing energy produced from ocean level fluctuation superior to conventional techniques can be summarized as follows:

1. The power generation apparatus of the present invention is surely able to realize a perfect and reliable function of converting the potential energy produced from ocean level fluctuation into electric power effectively by installing main components of the apparatus above water level to minimize the fault rate and maintenance cost, and lengthen the equipment lifetime.

2. The power generation apparatus of the present invention is easy for removing to anywhere power is needed by dragging the working platform to the site by ship and then fix it thereat conveniently.

Those who are skilled in the art will readily perceive how to modify the invention. Therefore, the appended claims are to be construed to cover all equivalent structures which fall within the true scope and spirit of the invention.

What is claimed is:

1. Power generation apparatus utilizing energy produced from ocean level fluctuation comprising:

a working platform with a generator unit installed coaxially thereon, and several foundations installed thereunder;

a plurality of guy rods disposed circulating a circumference of said working platform and penetrating through said working platform to enable up and down movements of said rods through the platform, each said guy rod is attached to a buoy under said working platform, a brace installed near a bottom end of said each guy rod for preventing the rod from rocking when said apparatus is working, a clamper fixed to an upper portion of said guy rod above said working platform for shading a ratchet wheel therein said ratchet wheel having a connecting rod connected to a center of said ratchet wheel, wherein said connecting rod extends to an inner part of said generator unit, a positioning head fitted at a front end of said connecting rod for positionin said ratchet wheel and said connecting rod at positions above said working platform thereat and to prevent shifting of said ratchet wheel and said connecting rod by said guy rod, two chains combined to both sides of said ratchet wheel in said clamper, and two pairs of posts whose lengths are slightly longer than a radius of said ratchet wheel wherein said pairs of posts are installed respectively above and below said ratchet wheel, each of said pairs having a pivot attached at a center of a lateral surface of said guy rod, both said pairs of posts are bent upward with respect to said pivots, and two first stoppers formed respectively on said working platform below said two posts, and two second stoppers respectively formed diagonally to former said first stoppers to be disposed on said working platform above said two posts whereby said ratchet wheel engages said chain and rotates in one direction.

2. The power generation apparatus of claim 1, wherein an inner part of said buoy is made hollow and can be filled with water, sand or other weights for adjusting its weight.

3. The power generation apparatus of claim 1, wherein an inner part of said foundation is made hollow and can be filled with water, sand or other weights for adjusting its weight.

4. The power generation apparatus of claim 1, wherein a length of said foundation can be adjusted to enable said working platform to be settled at various locations on the ocean.

5. The power generation apparatus of claim 1, wherein said working platform is able to float on the ocean surface by means of fixing said foundations stably at predetermined places.

6. The power generation apparatus of claim 1, wherein terminals of said two pairs of posts are equipped with rollers for reducing the friction between said posts and said chains.

7. The power generation apparatus of claim 1, wherein at a place where said guy rod penetrating through said working platform a bearing is provided for smoothing an operation of said guy rod.

* * * * *